United States Patent Office 2,847,389
Patented Aug. 12, 1958

2,847,389

SPINNING SOLUTION COMPRISING TERNARY POLYMERS OF ACRYLONITRILE DISSOLVED IN CONCENTRATED AQUEOUS SALT SOLUTIONS

Robert D. Evans, Norwalk, Conn., assignor to American Cyanamid Company, New York, N. Y., a corporation of Maine No Drawing. Application September 11, 1953
Serial No. 379,739

11 Claims. (Cl. 260—29.6)

This invention relates broadly to spinning (extrudable) solutions and more particularly to such solutions containing a particular ternary polymer and a particular solvent therefor.

The ternary polymers used in producing the spinning solutions of this invention are polymers of a mixture of comonomers consisting of, by weight, from 2 to 15% (preferably from 2 to 10%) of at least one acrylamide represented by the formula I
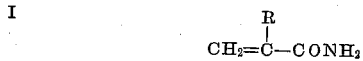

where R represents a number of the class consisting of hydrogen and the methyl radical, from 1.5 to 15% (preferably from 2 to 10%) of at least one vinylpyridine, and the remainder acrylonitrile. The acrylamide component can be acrylamide alone, or methacrylamide alone, or mixtures thereof in any proportions. A single vinylpyridine or a plurality of vinylpyridines in any proportions can be used. This ternary polymer is dissolved in a solvent comprising a concentrated aqueous solution of a water-soluble salt which yields highly hydrated ions in an aqueous solution, more particularly a water-soluble thiocyanate, and specifically sodium thiocyanate. The resulting solutions are useful for the production of readily dyeable, oriented structures including continuous mono- and multifilaments, staple fibers, rods, bars, tubes, films, sheets, tapes, etc.

The suggestion was made prior to my invention that various acrylonitrile copolymer compositions could be prepared by polymerizing acrylonitrile either alone or admixed with various other monomers which are copolymerizable therewith, including such monomers as methyl methacrylate and other esters of methacrylic acid, esters of acrylic and alpha-chloroacrylic acids, vinyl chloride, acrylamide, vinyl acetate and 2-vinylpyridine. For example, in Arnold Patent No. 2,456,360 there is disclosed and claimed a process of polymerizing an acrylonitrile composition wherein the polymerizable portion is substantially entirely monoethylenically unsaturated and is at least 90% acrylonitrile, the remainder being such monomers as have just been mentioned, and the process itself involving carrying out the polymerization reaction in the presence of from 0.01 to 2%, by weight of the polymerizable components, of dithioglycidol. Also, Arnold Patent No. 2,491,471 discloses and claims copolymers containing from 2 to 10% of recurring vinylpyridine units, the remainder of the copolymer consisting of acrylonitrile units. Both of these Arnold patents also suggest that fibers be produced from the vinylpyridine-containing polymers. Both disclose only organic compounds as solvents for the acrylonitrile polymerization product, each mentioning dimethylformamide as a solvent for the polymer to yield a spinnable solution, while Patent No. 2,456,360 additionally discloses tetramethylene sulfone as a solvent for the polymer of acrylonitrile.

Various methods of producing filaments, films and other shaped or fabricated articles from homopolymeric acrylonitrile and from copolymers or interpolymers of a major proportion of acrylonitrile and a minor proportion of another monomer or monomers heretofore have been suggested, and these methods have involved the use of many different kinds of spinning solutions wherein various compounds or mixtures of compounds constitute the solvent for the acrylonitrile polymerization product. For example, in Rein U. S. Patent No. 2,140,921 it is proposed that certain polyvinyl compounds including polyacrylonitrile (homopolymeric acrylonitrile) and copolymers of acrylonitrile with another vinyl compound be dissolved in concentrated aqueous solutions of inorganic salts, e. g., the chlorides, bromides, iodides, thiocyanates, perchlorates and nitrates, and that the resulting solutions be used in the manufacture of threads, films, etc. Also, in U. S. Patents 2,404,713–728, as well as in many others, is disclosed the use of various organic-solvent solutions of polyacrylonitrile and copolymers of at least 85% by weight of acrylonitrile with another monomer or monomers, and the utilization of such solutions in forming films, filaments, etc. Spinning solutions formed by dissolving a two-component copolymer of a major proportion of acrylonitrile and a minor proportion of acrylamide and methacrylamide in a concentrated aqueous solution of calcium thiocyanate, or of other inorganic salt of the kind mentioned above, are disclosed in, for instance, Cresswell Patent No. 2,558,730.

To the best of my knowledge and belief it was not known or suggested prior to my invention that new and valuable spinning solutions, which are clear and homogeneous, could be produced by dissolving the particular ternary polymer described in the second paragraph of this specification in a concentrated aqueous solution of a water-soluble salt which yields highly hydrated ions in an aqueous solution, and that such solutions could be converted into films, filaments or threads, etc., by wet-spinning methods, more particularly by extruding through an opening or plurality of openings into a coagulating bath containing a liquid which is a non-solvent for the polymerization product but which will dissolve the solvent in which said product is dissolved.

Copolymers of acrylonitrile produced by copolymerization of a plurality of comonomers including acrylonitrile and a vinylpyridine, specifically 2-methyl-5-vinylpyridine, constitute a particular type or kind of copolymer having properties different from the usual copolymers of acrylonitrile, e. g., in their amenability to dyeing with an acid dye; their solubility in various solvents; their ease of spinning or forming into filaments or threads; their stretchability which, in turn, is reflected in their degree of orientation and in the physical properties of the oriented filament; and in many other characteristics. Hence it was entirely unobvious and in no way could have been predicted that new and valuable spinning solutions could be produced from a ternary polymer of a mixture of compatible, copolymerizable monomers (comonomers) consisting of, by weight, from 2 to 15% of acrylamide and/or methacrylamide, from 1.5 to 15% of at least one vinylpyridine, and the remainder acrylonitrile, by dissolving the said ternary polymer in a concentrated aqueous solution of a water-soluble salt which yields highly hydrated ions in an aqueous solution. This is immediately apparent when it is considered that the patent and scientific literature is, to the best of my knowledge and belief, completely silent with respect to the solubility of the specific class of copolymers described in the preceding sentence in a concentrated aqueous solution of sodium thiocyanate or other water-soluble salt which yields highly hydrated ions in an aqueous solution. This fact could have been discovered only by experiment, and is the kind of discovery which previously has been recognized as constituting patentable invention. (See, for example, U. S. Patents 2,117,210, 2,140,921, 2,404,713–728, and 2,644,803, especially claims 2–6 thereof directed to a spinning solution formed of a particular acrylonitrile-allyl alcohol copolymer dissolved in a water-soluble salt which yields highly hydrated ions in an aqueous solution.)

The ternary polymers of acrylonitrile, acrylamide and/or methacrylamide, and one or more vinylpyridines (e. g., two, three, four or any desired number), specifically 2-methyl-5-vinylpyridine, 2-vinylpyridine, 2-vinyl-5-ethylpyridine, etc., used in making the spinning solutions of this invention are produced by known methods such, for instance, as those disclosed in the copending application of Walter M. Thomas, Serial No. 375,576, filed August 20, 1953, with particular reference to the production of a subclass of ternary polymers within the broader class of tripolymers employed in practicing the present invention. The copolymerization reaction is so carried out that there is obtained a fiber-forming ternary polymer of a suitable average molecular weight, for instance within the range of from about 30,000 to about 200,000, more particularly from about 40,000 to about 100,000, and still more particularly from about 60,000 to about 80,000. (The average molecular weight may be determined, for example, from a viscosity value of a dimethylformamide solution of the ternary polymer and calculations by means of the Staudinger equation; reference: U. S. Patent No. 2,404,713.) Ternary polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a fiber-forming material and such polymers, therefore, can be used in forming the spinning solutions of the present invention.

The spinning solutions are produced by dissolving the ternary polymer in a solvent comprising a concentrated aqueous solution of a water-soluble salt which yields highly hydrated ions in an aqueous solution. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono- (lower alkyl)-substituted guanidine thiocyanates, and the symmetrical and unsymmetrical di-(lower alkyl)-substituted guanidine thiocyanates; and salt solutions of the kind disclosed and claimed in U. S. Patents 2,648,646, –7 and –8.

The concentration of the acrylonitrile-vinylpyridine-acrylamide (and/or methacrylamide) ternary polymer in the chosen solvent should be such that a composition having a workable viscosity is obtained. This concentration will depend, for example, upon the particular solvent and extrusion apparatus employed, the diameter of the fiber or other shaped article to be extruded and the average molecular weight of the ternary polymer. The concentration may range, for example, from 7 to 8% up to 16 or 18% or more by weight of the solution. The viscosity of the solution, as determined by measuring the time in seconds for a Monel metal ball ⅛ inch in diameter to fall through 20 cm. of the solution at 61° C., may be, for instance, from 20 to 200 seconds. Usually the best spinning solutions from the standpoint of coagulation and optimum properties of the precipitated gel are those which contain the highest concentration of the ternary polymer, and the lowest concentration of zinc chloride, sodium or calcium thiocyanate, guanidine thiocyanate or other salt of the kinds aforementioned, which concentrations are consistent with solubility and viscosity characteristics.

Fibers and other shaped articles are preferably formed from the spinning solutions of this invention by methods such as are disclosed and claimed in, for instance, Cresswell Patents 2,558,730, –731 and –732, and Cresswell et al. Patent 2,558,733.

In order that those skilled in the art may better understand how the present invention can be carried into effect, the following examples are given by way of illustration and not by way of limitation. All parts and percentages are by weight.

*Example 1*

An excellent spinning solution is produced from a ternary polymer of a mixture of comonomers consisting of about 5% of acrylamide, about 5% of methyl vinylpyridine consisting mainly of 2-methyl-5-vinylpyridine, and the remainer acrylonitrile by dissolving this polymer in a concentrated aqueous solution of sodium thiocyanate. The procedure is as follows:

Using an efficient mechanical stirrer 1730 g. of the moist polymer (about 58.4% water content) and 276 g. of water are mixed together to form a rather thick slurry. To this slurry is added 454 g. of crystalline sodium thiocyanate while maintaining the agitation. The slurry becomes very thick and, after 10 minutes, 4100 ml. of 57.5% aqueous sodium thiocyanate solution is added and stirring is continued for an additional 60 minutes. The solution, after filtering and deaerating, is clear, bright and has a pale, straw color.

The deaerated spinning solution or "dope" is heated to about 70° C. prior to extrusion through a 45-hole spinneret having openings 75 microns in diameter into a coagulating bath comprising a 10% aqueous solution of sodium thiocyanate maintained at −3° C. After washing thoroughly with water to remove the sodium thiocyanate, the filamentary material is stretched 900% in hot water (about 99.5° C.), continuously dried on converging drying rolls, and is then thermally retracted by passage through a heat-treating furnace in a relaxed, free-to-shrink state. The resulting continuous-filament yarn has a dry tenacity of 3.7 grams per denier and a dry elongation of 22%. It is effectively dyed, using normal wool-dyeing techniques, with such typical acid dyes (wool dyes) as Calcocid Alizarine Blue SAPG (C. I. No. 1054) and Calcocid Alizarine Blue SBA (Pr. No. 12) to give clear, deep shades. Satisfactory union dyeing with wool can be obtained with the above and other acid dyes, and the rate of exhaustion of the dye bath can be controlled by the addition of a typical dye-bath additive such, for example, as Glauber's salt.

*Example 2*

A spinning solution and fiber are produced in essentially the same manner described under Example 1 with the exception that the spinning solution is made from a ternary polymer of a mixture of comonomers consisting of about 95% acrylonitrile, about 5% of acrylamide and about 5% of a vinylpyridine which has a single vinyl grouping attached to the pyridine nucleus, which is otherwise unsubstituted and which consists mainly of 2-vinylpyridine. The continuous-filament yarn produced from this spinning solution is dyed with the same dyes in the same manner used in dyeing the yarn of Example 1. The latter is dyed to deeper shades than is the yarn of this example, showing that the methyl vinylpyridine employed in making the ternary polymer of Example 1 imparts much better dyeability to the polymer than does the vinylpyridine (mainly 2-vinylpyridine) employed in making the ternary polymer of this example.

*Example 3*

Twenty-six hundred (2600) parts of 57.5% aqueous sodium thiocyanate solution, 2194 parts of water and 3626 parts of a ternary polymer of a mixture of monomers consisting of about 5% of methacrylamide, about 5% of methyl vinylpyridine consisting mainly of 2-methyl-5-vinylpyridine, and the remainder acrylonitrile are mixed in a high-speed turbine mixer for 15 minutes, after which stirring is stopped and full vacuum is applied for 30 minutes. High-speed stirring is then resumed and 12,150 parts of 57.5% aqueous sodium thiocyanate solution is introduced. Thereafter 1500 parts of dry, crystalline sodium thiocyanate is added, and stirring is continued for 45 minutes. The resulting viscous spinning solution or "dope" is filtered and deaerated.

The deaerated dope is heated to about 90° C. prior to extrusion through a 2330-hole spinneret having openings 90 microns in diameter into a coagulating bath comprising a 10% aqueous solution of sodium thiocyanate maintained at —3° C. The multifilament yarn is water-washed, stretched 8-fold in a boiling water bath and air-dried. The finished yarn is dyed to heavy shades with a vat dye, specifically 1% Calcoloid Pink FFD Dbl. (Pr. No. 109), and with acid dyes, specifically 2% Calcocid Alizarine Blue SBA (Pr. No. 12) and 2% Calcocid Fast Red A (C. I. No. 176), at normal dyeing temperatures without using the copper-ion technique.

*Example 4*

Example 1 is repeated with the exception that the ternary polymer employed in making the spinning solution is a polymerization product of a mixture of monomers consisting of about 3% of acrylamide, about 10% of a vinylpyridine consisting mainly of 2-vinylpyridine, and the remainder acrylonitrile. A continuous-filament yarn is produced from the resulting spinning solution in essentially the same manner described under Example 1. The finished yarn is dyed to heavy shades with the same dyes used in dyeing the yarn of Example 1, the dyed yarns having about the same shades. This comparison shows the superiority of a methyl vinylpyridine, specifically one composed predominantly of 2-methyl-5-vinylpyridine, in improving the dyeability of a ternary polymer thereof with acrylonitrile and acrylamide, and more particularly the dyeability of a fiber formed from a solution of such a ternary polymer in a concentrated aqueous salt solution of the kind used in practicing this invention.

*Example 5*

Five hundred and seventy (570) parts of a dry, ground ternary polymer of a mixture of comonomers consisting of about 7.5% of acrylamide, about 2.5% of methyl vinylpyridine consisting mainly of 2-methyl-5-vinylpyridine, and the remainder acrylonitrile are well mixed in a stainless steel vessel with 710 parts of water and 3500 parts of a 57.5% aqueous solution of sodium thiocyanate. The resulting thick solution or "dope" is filtered through cotton batting and then evacuated until all the air has been removed.

The filtered and deaerated dope is heated to about 72° C. and extruded through a 40-hole spinneret having openings 90 microns in diameter into a coagulating bath comprising a 10% aqueous solution of sodium thiocyanate maintained at —2° C. The resulting multifilament yarn is well washed on rolls and then stretched 7.5 times in a boiling water bath. The stretched yarn is continuously dried on heated rolls, thermally relaxed about 15% by passing through a heat-treating furnace in a relaxed, free-to-shrink state, and collected on a ring twister at 60 meters per minute. This yarn is more readily dyed to a deeper shade with an acid dye, e. g., Calcocid Scarlet MOO Con. (C. I. No. 252), than is a fiber similarly produced from a copolymer of about 10% acrylamide and 90% acrylonitrile, and which has been dyed with the same dyestuff in the same manner. The dry tensile strength is more than 3 grams per denier, and the dry elongation is about 20%.

*Example 6*

The ternary polymer employed in this example is one which is obtained by polymerization of a mixture of monomers consisting of about 10% of acrylamide, about 2% of ethyl vinylpyridine consisting mainly of 2-vinyl-5-ethylpyridine, and the remainder acrylonitrile.

Nine hundred and three (903) parts of a wet crumb, containing 63% of the dry ternary polymer, is well mixed with 4720 parts of a 57.5% aqueous solution of sodium thiocyanate and 357 parts of water. The mixture is slowly stirred in a stainless steel vessel for 30 minutes under vacuum, and is then filtered through cotton batting. The solution is transferred to a vacuum tank and held under vacuum for about 16 hours.

The filtered and deaerated dope is heated to about 70° C. and extruded, coagulated and washed as described under Example 5. The washed yarn is stretched 7 times while passing through a boiling water bath, and after being thermally relaxed, is collected on a spinning bobbin at approximately 40 meters per minute. The acid dye receptivity is considerably improved over that of a yarn similarly produced from a copolymer of about 12% acrylamide and 88% acrylonitrile, and which has been dyed with the same dyestuff in the same manner.

Vinylpyridines which can be employed in making ternary polymers with acrylonitrile and acrylamide, methacrylamide or mixtures of acrylamide and methacrylamide in any proportions, and those ternary polymers then employed in making spinning (extrudable) solutions as herein described, include vinylpyridines represented by the formula II
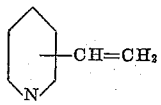

and which include 2-vinylpyridine, 3-vinylpyridine and 4-vinylpyridine; methyl vinylpyridines represented by the formula III
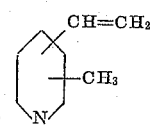

and which include 2-methyl-3-vinylpyridine, 3-vinyl-4-methylpyridine, 3 - vinyl - 5 - methylpyridine, 2-vinyl-3-methylpyridine, 2 - vinyl - 4 - methylpyridine, 2-vinyl-5-methylpyridine, 2 - vinyl - 6 - methylpyridine, 2-methyl-4-vinylpyridine and 3-methyl-4-vinylpyridine. The vinylpyridines embraced by Formula III are a preferred subgroup within a broader class of vinylpyridines that are advantageously employed in making ternary polymers for use in practicing the present invention and which may be represented by the formula IV
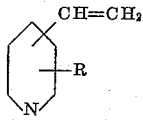

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, 2-vinyl-4, 6-dimethylpyridine, 2-vinyl-4,6-diethylpyridine and others embraced by the formula V
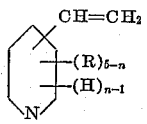

wherein R represents a lower alkyl radical, examples of which have been given hereinbefore, and $n$ represents an integer from 1 to 5, inclusive.

One can substitute in Examples 1 to 6, inclusive, equivalent amounts of any of the vinylpyridines, of which numerous examples have just been given, for the specific vinylpyridine named in the individual example thereby to produce spinning solutions from which modified polyacrylonitrile fibers having improved properties, as compared with those produced from homopolymeric acrylonitrile and other copolymeric acrylonitriles, can be obtained.

Also, instead of using a concentrated aqueous solution of sodium thiocyanate, one can substitute in Examples 1 to 6, inclusive (as set forth in the individual example or as the examples are considered in the light of the preceding paragraph), a concentrated aqueous solution of calcium thiocyanate, potassium thiocyanate, zinc chloride, guanidine thiocyanate, or any other water-soluble salt which yields highly hydrated ions in an aqueous solution, of which numerous examples have been mentioned hereinbefore and are given in the aforementioned patents, or mixtures which include such salts.

I claim:

1. A spinning solution comprising (1) a ternary polymer of a mixture of comonomers consisting of, by weight, from 2 to 15% of at least one acrylamide represented by the formula

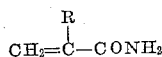

where R represents a member of the class consisting of hydrogen and the methyl radical, from 1.5 to 15% of at least one vinylpyridine, and the remainder acrylonitrile, and (2) a solvent for said ternary polymer comprising a concentrated aqueous solution of a water-soluble salt which yields highly hydrated ions in an aqueous solution.

2. A spinning solution as in claim 1 having a viscosity of from 20 to 200 seconds as determined by measuring the time in seconds for a Monel metal ball ⅛ inch in diameter to fall through 20 cm. of the solution at 61° C.

3. A spinning solution as in claim 1 wherein the ternary polymer is a polymer of a mixture of comonomers consisting of, by weight, from 2 to 10% of acrylamide, from 2 to 10% of a vinylpyridine represented by the formula

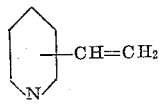

and including 2-vinylpyridine, and the remainder acrylonitrile.

4. A spinning solution as in claim 1 wherein the ternary polymer is a polymer of a mixture of comonomers consisting of, by weight, from 2 to 10% of acrylamide, from 2 to 10% of methyl vinylpyridine including 2-methyl-5-vinylpyridine, and the remainder acrylonitrile.

5. A spinning solution as in claim 1 wherein the ternary polymer has an average molecular weight within the range of from about 40,000 to about 100,000.

6. A spinning solution as in claim 1 wherein the solvent for the ternary polymer is a concentrated aqueous solution of a water-soluble thiocyanate.

7. A spinning solution as in claim 6 wherein the water-soluble thiocyanate is sodium thiocyanate.

8. A spinning solution comprising (1) a ternary polymer of a mixture of comonomers consisting of, by weight, from 2 to 15% of at least one acrylamide represented by the formula

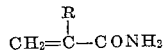

where R represents a member of the class consisting of hydrogen and the methyl radical, from 1.5 to 15% of at least one vinylpyridine, and the remainder acrylonitrile, said ternary polymer yielding a solution having a specific viscosity at 40° C. within the range of 2 to 10 when 1 gram of the said polymer is dissolved in 100 ml. of 60% aqueous sodium thiocyanate solution, and (2) a solvent for said ternary polymer comprising a concentrated aqueous solution of a water-soluble salt which yields highly hydrated ions in an aqueous solution.

9. A spinning solution comprising (1) a ternary polymer of a mixture of comonomers consisting of, by weight, from 2 to 10% of acrylamide, from 2 to 10% of a vinylpyridine represented by the formula

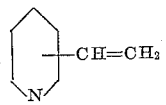

and including 2-vinylpyridine, and the remainder acrylonitrile, and (2) a solvent for said ternary polymer comprising a concentrated aqueous solution of sodium thiocyanate.

10. A spinning solution comprising (1) a ternary polymer of a mixture of comonomers consisting of, by weight, from 2 to 10% of acrylamide, from 2 to 10% of methyl vinylpyridine including 2-methyl-5-vinylpyridine, and the remainder acrylonitrile, and (2) a solvent for said ternary polymer comprising a concentrated aqueous solution of sodium thiocyanate.

11. A spinning solution comprising (1) a ternary polymer of a mixture of comonomers consisting of, by weight, from 2 to 10% of acrylamide, from 2 to 10% of methyl vinylpyridine including 2-methyl-5-vinylpyridine, and the remainder acrylonitrile, said ternary polymer yielding a solution having a specific viscosity at 40° C. within the range of 2 to 10 when 1 gram of the said polymer is dissolved in 100 ml. of 60% aqueous sodium thiocyanate solution, and (2) a solvent for said ternary polymer comprising a concentrated aqueous solution of sodium thiocyanate, said spinning solution having a viscosity of from 20 to 200 seconds as determined by measuring the time in seconds for a Monel metal ball ⅛ inch in diameter to fall through 20 cm. of the solution at 61° C.

References Cited in the file of this patent

UNITED STATES PATENTS

| 2,491,471 | Arnold | Dec. 20, 1949 |
| 2,558,730 | Cresswell | July 3, 1951 |

FOREIGN PATENTS

| 680,359 | Great Britain | Oct. 1, 1952 |
| 500,644 | Belgium | July 16, 1951 |

UNITED STATES PATENT OFFICE
CERTIFICATE OF CORRECTION

Patent No. 2,847,389                                              August 12, 1958

Robert D. Evans

It is hereby certified that error appears in the printed specification of the above numbered patent requiring correction and that the said Letters Patent should read as corrected below.

Column 1, line 27, for "number" read -- member --; column 4, line 16, for "remainer" read -- remainder --; line 24, for "ml," read -- ml. --; column 5, line 16, after "Dbl." insert -- Pdr. --.

Signed and sealed this 21st day of October 1958.

(SEAL)
Attest:

KARL H. AXLINE
Attesting Officer

ROBERT C. WATSON
Commissioner of Patents